June 21, 1960  W. D. REEVES  2,941,238
POULTRY TRIMMING MACHINE
Filed April 28, 1958  2 Sheets-Sheet 1
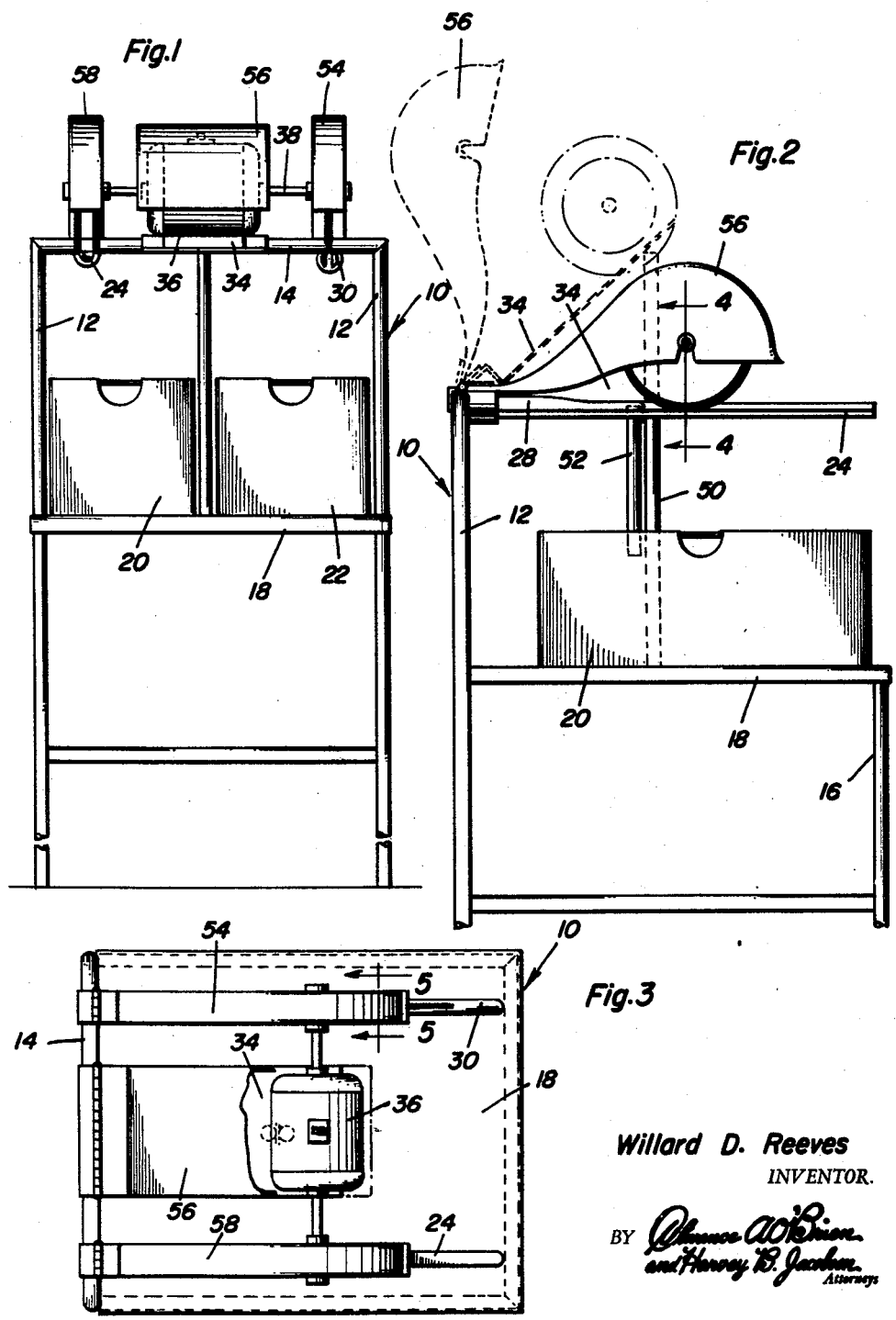
Willard D. Reeves
INVENTOR.

June 21, 1960 W. D. REEVES 2,941,238
POULTRY TRIMMING MACHINE
Filed April 28, 1958 2 Sheets-Sheet 2
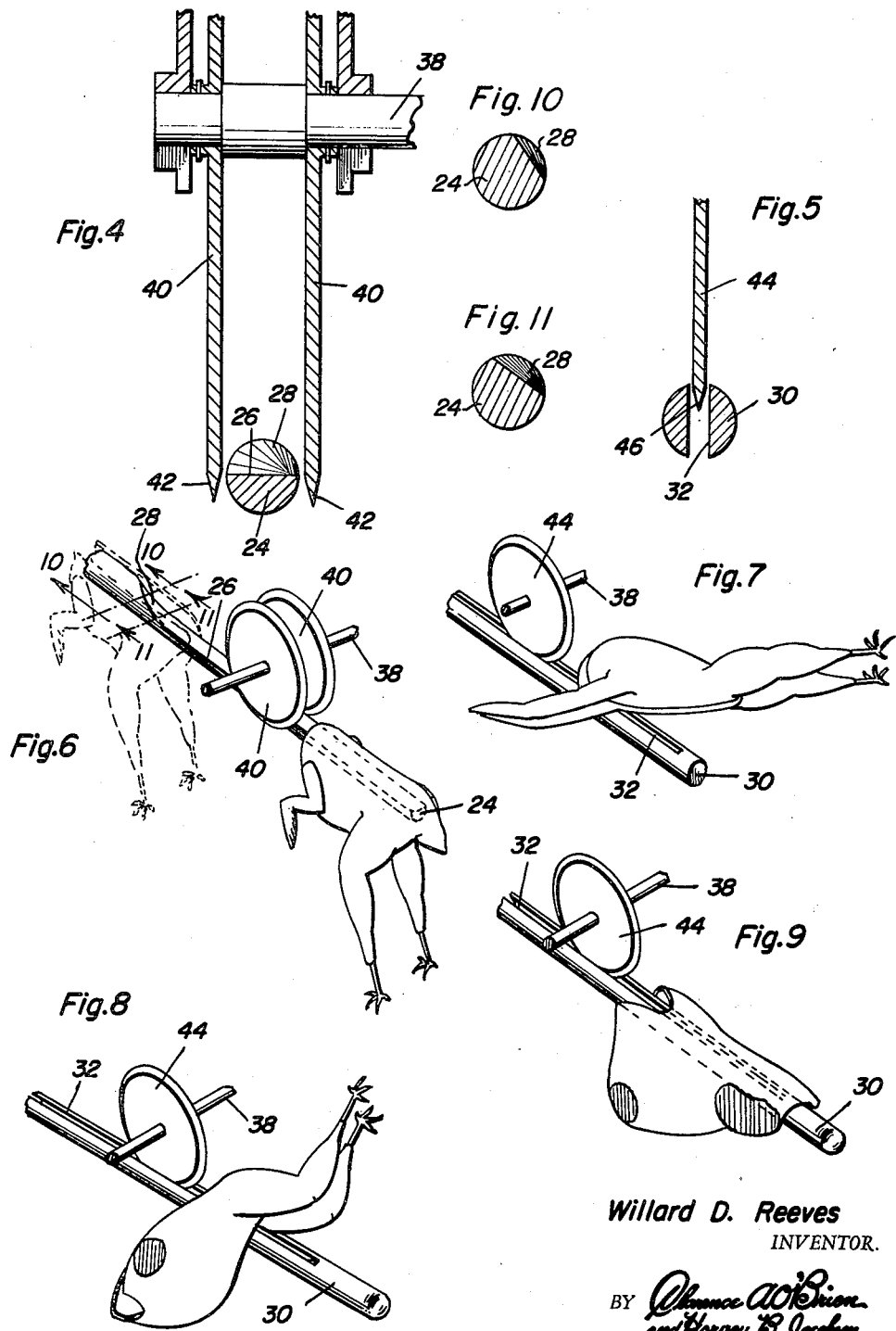
Willard D. Reeves
INVENTOR.

United States Patent Office 2,941,238
Patented June 21, 1960

2,941,238
POULTRY TRIMMING MACHINE
Willard D. Reeves, P.O. Box 773, Center, Tex.
Filed Apr. 28, 1958, Ser. No. 731,533
2 Claims. (Cl. 17—11)

This invention comprises a novel and useful poultry trimming machine and more particularly relates to an apparatus to facilitate the dressing of poultry by selectively removing the legs, wings and backbone thereof in an improved manner.

The principal object of this invention is to provide a machine for trimming and dressing poultry with precision and facility.

A further object of the invention is to provide a poultry trimming machine having a guide receivable in the cavity of poultry to properly position the same for removing the backbone thereof by rotary saw means in an improved manner.

A further object of the invention is to provide a poultry trimming and dressing machine which will facilitate the removal of the backbone of a fowl with a minimum loss of the more desirable cuts thereof.

A further object of the invention is to provide a poultry trimming machine in accordance with the preceding objects whereby the cutting blades may be readily cleaned or serviced as desired and whereby easy access may be had thereto.

A still further object of the invention is to provide a poultry trimming and cutting machine which will eliminate or reduce meat dust as with conventional saws, shall require only occasional sharpening during operation, shall be safer for the operator to use and reduce to a minimum the possibility of injury to the operator from the cutting knives of the machine.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a front elevational view of a poultry trimming machine in accordance with this invention;

Figure 2 is a side elevational view of the machine of Figure 1, the cutting means being shown in its lowered operative position in full lines and in a raised inoperative position in dotted lines therein;

Figure 3 is a top plan view of the arrangement of Figure 1, a part of the hood covering the motor being broken away;

Figure 4 is a fragmentary vertical transverse sectional view taken upon an enlarged scale substantially upon the plane indicated by section line 4—4 of Figure 2 and showing position of the pair of rotary knives and the guide bar which cooperate to remove the backbone of a fowl;

Figure 5 is a fragmentary view in vertical transverse section taken substantially upon the plane indicated by section line 5—5 of Figure 3 and upon an enlarged scale and showing the arrangement of the severing knife and the support bar with which the same is associated;

Figure 6 is a diagrammatic view illustrating the manner in which the guide bar and rotary knives are employed to remove the backbone of a fowl;

Figure 7 is a somewhat diagrammatic view in which another guide bar and rotary knife of the invention are employed to sever the wings of a fowl;

Figure 8 is a view similar to Figure 7 but showing the manner in which the device is employed to sever the legs of a fowl;

Figure 9 is a view similar to Figure 7 but showing the manner in which the device is employed to split the breasts of a fowl;

Figure 10 is a vertical sectional view taken substantially along the plane 10—10 of Figure 6; and Figure 11 is a vertical sectional view taken substantially along the plane 11—11 of Figure 6.

As shown best in Figures 1-3, the poultry trimming apparatus comprises a support designated generally by the numeral 10 and which may consist of a stand constructed of pipe or other structural elements to provide a sturdy supporting frame. At the back portion of the frame two or more uprights 12 rise thereabove and have a cross member or top rail 14. Other elements are secured to the members 12 and extend forwardly to rest upon the front leg members 16 to provide a table or shelf 18 which may have any suitable working surface thereon. A pair of trays 20 and 22 respectively may rest upon the table surface 18 to receive poultry to be dressed by this machine and pieces of poultry after they have been dressed, scraps and waste meat and the like.

Fixedly and rigidly secured to the support 10, as to the top rail 14, are a pair of substantially horizontally disposed bars which overlie the table 18 and are disposed in substantially side-by-side relation in the manner suggested in Figure 3. One of these bars 24, hereinafter referred to as a guide bar is adapted to slidably receive and impale fowl thereon as shown in Figures 6 and 9. For this purpose the bar has a flat top surface 26 from its outward end extending throughout the major portion of its length to provide a flat surface upon which the fowl may readily slide and be held firmly in position for a purpose to be subsequently set forth. Adjacent its inward end, however, the guide bar is provided with a transversely curving and slanting surface or contour 28 which tilts toward one side of the bar from its uppermost portion, for a purpose to be subsequently set forth.

The other bar, indicated at 30 is hereinafter referred to as a cut-off bar. This bar is provided with a vertical slot 32 intermediate its ends and extending throughout a major portion of its length or a sufficient portion thereof for a purpose to be hereinafter set forth.

Mounted on the support, as upon the top rail 14, is a supporting bracket 34 which is disposed between the bars 24 and 30 and is hinged for vertical swinging movement about the horizontal axis of the top rail 14. Secured to this supporting bracket 34 is an electric motor 36 carrying and driving an arbor 38. At one end of this arbor, as shown in Figure 4, there are secured a pair of disks 40 having knife edges 42 thereon and which thus constitute rotary knives. These rotary knives are so positioned that they are closely adjacent to and disposed on opposite sides of the guide bar 24. As shown in Figure 4 the knives are slightly spaced from this guide bar. It will be understood, however, that they may actually rub against and contact the guide bar in order to provide a shearing action with the top surface 26 thereof if desired.

At the other end of the arbor 38, there is provided a single disk 44 likewise having a knife edge 46 thereon. The disk 44 comprises a cut-off knife and is also disposed closely adjacent to the cut-off bar 30 for cooperation therewith. Preferably, as shown in Figure 5, the cut-off knife is so positioned that its edge or blade 46 will extend into the previously mentioned slot 32 of the cut-off bar. In this arrangement also, if desired, the cut-off knife may be of sufficient width to have its sides rub against the inside side walls of the slot 32 if desired.

As previously mentioned, the motor support bracket 34 is hinged to the top rail 14. Consequently, the arbor and the motor may be swung vertically about the axis of the rail 14 to raise and lower the knives with respect to the bars. Thus, the knives can be lifted to obtain access to the bars or the knives for the purposes of cleaning, inspecting, or servicing the same as desired.

Secured to the platform 18 at about the central portion of the same is a support post 50. This post at its upper end has a hinged extension 52 which may be swung into alignment with the posts or may be pivoted downwardly. The arrangement is such that the upper end of the posts will engage the bracket 34 of the motor mount and thus support the motor and the arbor in the operative position of the same with respect to the guide bar and the cut-off bar. However, when it is desired to lift the motor mount out of the way, as shown in dotted lines in Figure 2, the arbor and motor mount are swung upwardly, the extension 52 is pivoted into alignment with the post 50 and the motor support bracket 34 is then rested thereon to hold the motor in a raised position.

Also hinged to the top rail 14 are a plurality of hoods shown at 54, 56 and 58 in Figure 14. These hoods respectively cover the upper portions of the cut-off knife 44, the motor 36 and the pair of knives 40. The hinged connection for these hoods enable the same to be raised as suggested in dotted lines in Figure 2 to permit raising the arbor as previously mentioned.

In operation, this apparatus provides a means for effectively, efficiently and with precision triming and dressing a fowl. A preferred method of trimming and dressing poultry in accordance with this invention and apparatus is as follows.

The fowl is impaled upon the outer end of the guide bar 24, which passes through the neck portion and through the cavity of the fowl, so that the back of the fowl is supported upon the flat surface 26 of the guide bar. In this position, the fowl is fed along the guide bar as suggested by the two positions thereof in Figure 6, so that the back of the fowl is caused to pass between the rotary knives 40. These knives slice the back of the fowl upon opposite sides of the backbone and closely adjacent thereto. The knives 40 are preferably spaced not more than about one inch apart so that the minimum amount of meat is removed with the backbone. As the fowl is slid forwardly, the backbone is thus severed from the body of the fowl, and in the left hand position shown in Figure 6, the severed backbone portion strikes the curved and progressively more sharply inclined surface 28 at the inward end of the guide bar, thus lifting out the severed backbone portion and dropping it to one side. Conveniently, the tray 20 may be disposed to receive the discarded, removed backbones.

Thereafter, the fowl may be rested across the cut-off bar 30, with the legs grasped by one hand and the wings grasped by the other hand of the operator, and slid along the cut-off bar until the cut-off knife 44 riding in slot 32 severs the wings precisely at the place desired. Thereafter, the position of the fowl upon the cut-off bar may be reversed as shown in Figure 8, and the cut-off bar will then sever the legs. Obviously, the legs may be severed as a unit, or they may be cut at the joints if desired.

Finally, when it is desired to split the backbone and breast, the body of the fowl with the wings and legs removed is then placed upon the cut-off bar as shown in Figure 9 with the breast uppermost and when it is slid along the bar the breast will be split.

It will be observed that during cutting off portions of the fowl upon the cut-off bar, the rotation of the cut-off knife 44 in the slot 32 will discharge the dust from the meat or bones severed by the knife downwardly through the slot 32, thereby maintaining the meat in a cleaned condition.

Further, the disposition of the rotary knives in this apparatus is such as to reduce to a minimum the possibility of injury to the operator by inadvertently contacting a knife during the handling of the fowl.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A poultry trimming machine comprising a support, a horizontal guide bar mounted upon said support and adapted to be slid through a fowl to support and position the latter with its back uppermost, a pair of rotary knives mounted upon said support and positioned closely adjacent said guide bar and on opposite sides thereof whereby to sever the backbone of a fowl for removal therefrom when the fowl is slid longitudinally upon said guide bar and through said knives, said guide bar having a flat top surface at its outer end extending along the major portion of its length and between and inwardly of said knives, said top surface at the inner end of said guide bar merging within a transversely inclined and curving surface, said curving surface tilting toward one side of said bar from its uppermost portion for removing and discarding from the fowl the backbone portion severed by said pair of knives.

2. The combination of claim 1 including a shaft upon which said pair of knives is fixedly secured, means hingedly mounting said shaft upon said support for swinging movement about a horizontal axis between a lowered cutting position and a raised idle position.

References Cited in the file of this patent

UNITED STATES PATENTS

| | | |
|---|---|---|
| 1,687,663 | Goldfinger | Oct. 16, 1928 |
| 2,169,951 | Hannan | Aug. 15, 1939 |
| 2,237,203 | Swanson | Apr. 1, 1941 |
| 2,580,599 | Rogers | Jan. 1, 1952 |
| 2,766,477 | Dahlberg | Oct. 16, 1956 |
| 2,771,633 | Bartels et al. | Nov. 27, 1956 |
| 2,807,046 | Hebenheimer | Sept. 24, 1957 |